(12) United States Patent
Sheldon

(10) Patent No.: X4878
(45) Date of Patent: Sep. 13, 1827

(54) CHURN

(76) Inventor: Daniel Sheldon

Daniel Sheldon

Letters Patent ( Patented September 13.1827)

The schedule referred to in these Letters Patent, & making part of the same, containing a description in the words of the said Daniel Sheldon, himself of his improvement in the churn.

Two buckets running in a horizontal position in the churn, first turning round these, back with the the shafts that run through the centre of these buckets running a sufficient height so as to attach the cards & cog wheels to propel the same by a large wheel or wheel with cogs or straps as the case may require:- This large wheel is made in proportion to the size of the churn, the platform of pine plank one inch & a quarter thick, & fifteen inches wide; two posts framed into this platform of one inch and a quarter thick, & fifteen inches wide, two posts framed into this platform, of one inch and a quarter thick, & four inches wide, the length agreeable to the height of the churn, a cross piece running immediately above the lid of the churn & Mortised into the two upright posts, of an inch thick, & four inches wide, framed in two pieces so as to take it apart that the buckets can be taken out or put in at pleasure — A top piece of one inch thick and three inches wide, on the top of one of the upright shafts, a mortice of sufficient width to receive the big wheel, a handle running from the centre of the big wheel - this handle to be from two and a half feet to three feet long, agreeably to the height of the churn: a pitman attached to the handle of sufficient length so as to be attached to two rockers purposely fixed to propel the machinery and a chair placed on these rockers so that a woman can set & nurse her child, & churn at the same time; or be propelled by the hand without a pitman, if you make a new churn, this frame can be dispensed with instead of the two upright posts, ears or staves of the churn to be left above the churn sufficient hight to embrace the machinery, & the machin-
ery placed in the same manner as heretofore mentioned in this
schedule. Those buckets heretofore mentioned, to be made of
slats running in a line with the shafts so as to mash regularly
through each other, those slats to be 3/4 of an inch thick & 2-
inches wide, & the first description of those buckets reference
being made to the drawings of the machine.

Daniel Sheldon

Witnesses
Joseph Hathaway.
C. M. Wright (440 words)
Exd. M.G.

(45 [illegible])

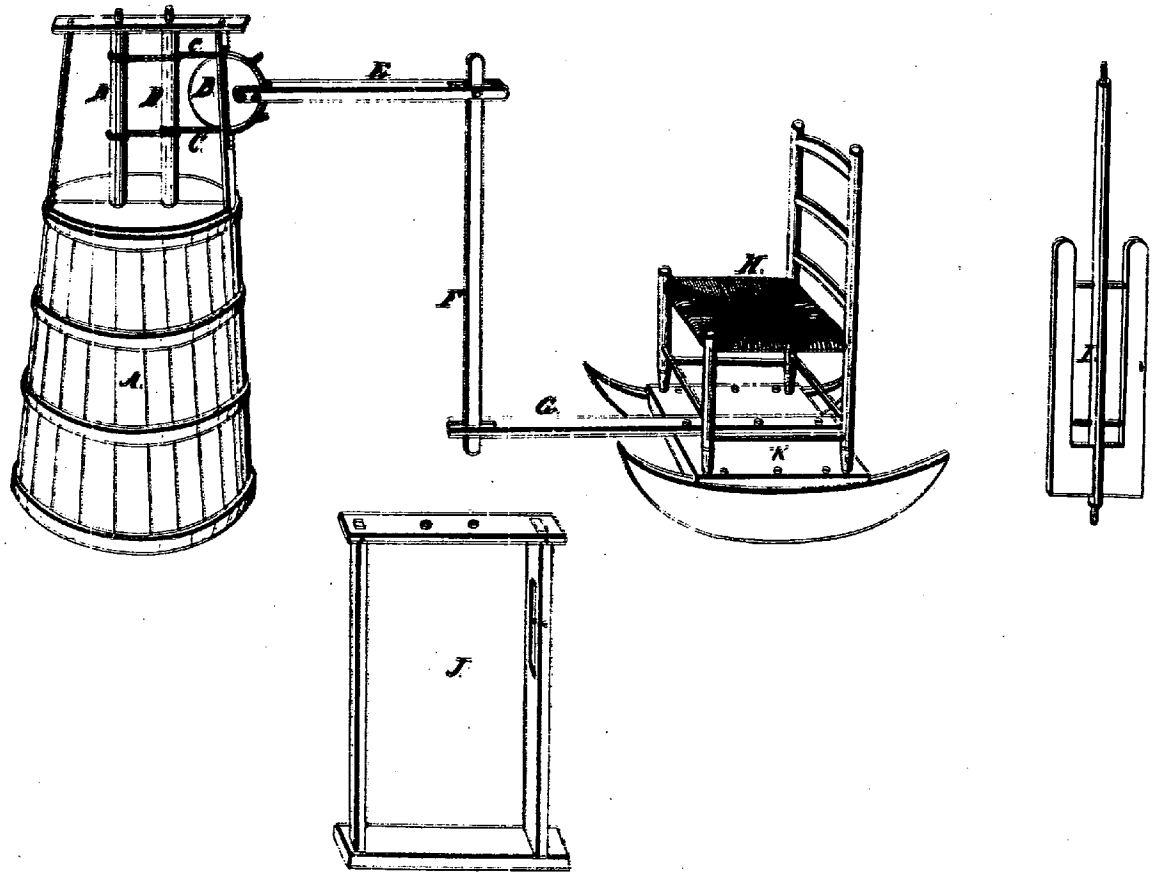

United States Patent
Patent No.: X4878
D. Sheldon.
Churn
No.
Patented Sept. 13, 1827.